US 9,080,464 B2

(12) United States Patent
Arase et al.

(10) Patent No.: US 9,080,464 B2
(45) Date of Patent: Jul. 14, 2015

(54) GAS TURBINE AND METHOD OF OPENING CHAMBER OF GAS TURBINE

(75) Inventors: Kenichi Arase, Hyogo-ken (JP); Eigo Katou, Hyogo-ken (JP); Masato Takeuchi, Hyogo-ken (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 984 days.

(21) Appl. No.: 12/918,920

(22) PCT Filed: Dec. 24, 2008

(86) PCT No.: PCT/JP2008/073482
§ 371 (c)(1),
(2), (4) Date: Aug. 23, 2010

(87) PCT Pub. No.: WO2009/107311
PCT Pub. Date: Sep. 3, 2009

(65) Prior Publication Data
US 2011/0000218 A1    Jan. 6, 2011

(30) Foreign Application Priority Data
Feb. 27, 2008    (JP) .................................. 2008-046697

(51) Int. Cl.
*F01D 25/14*    (2006.01)
*F01D 25/26*    (2006.01)
(Continued)

(52) U.S. Cl.
CPC ................ *F01D 25/26* (2013.01); *F01D 25/14* (2013.01); *F01D 25/243* (2013.01);
(Continued)

(58) Field of Classification Search
CPC ....... F01D 25/26; F01D 25/14; F01D 25/243; F01D 25/246; F23R 3/60; F23R 2900/00017; F02C 3/14; F05D 2230/70
USPC ............................................. 60/798, 722, 806
See application file for complete search history.

(56) References Cited

U.S. PATENT DOCUMENTS 2,853,227 A * 9/1958 Beardsley ........................ 60/805
2,988,886 A * 6/1961 Hamm et al. .................... 60/752
(Continued)

FOREIGN PATENT DOCUMENTS

CN    101029740 A    9/2007
EP    1278013 A2    1/2003
(Continued)

OTHER PUBLICATIONS

Office Action corresponding to JP 2010-500540, dated Feb. 14, 2012.
(Continued)

*Primary Examiner* — Ted Kim
(74) *Attorney, Agent, or Firm* — Lowe Hauptman & Ham LLP

(57) ABSTRACT

A gas turbine includes a combustor chamber that houses a combustor unit configured to include a combustor that burns fuel to generate combustion gas for rotating a rotor, a turbine unit chamber that houses a turbine-unit rotor blade and a disk that rotate upon reception of the combustion gas, a combustor casing that forms the combustor chamber, and a casing that is configured to include the combustor casing in which a divided portion on a surface orthogonal to a rotation axis of the rotor is not formed in the combustor casing, but is formed in a portion on a downstream side of flow of the combustion gas lower than the combustor casing.

12 Claims, 8 Drawing Sheets

(51) Int. Cl.
*F01D 25/24* (2006.01)
*F02C 3/14* (2006.01)
*F23R 3/60* (2006.01)

(52) U.S. Cl.
CPC .............. *F01D 25/246* (2013.01); *F02C 3/14* (2013.01); *F23R 3/60* (2013.01); *F05D 2230/70* (2013.01); *F23R 2900/00017* (2013.01)

(56) References Cited

U.S. PATENT DOCUMENTS

| | | | | |
|---|---|---|---|---|
| 3,034,298 | A * | 5/1962 | White | 60/726 |
| 3,088,281 | A * | 5/1963 | Soltau et al. | 60/752 |
| 3,623,318 | A * | 11/1971 | Shank | 60/806 |
| 3,908,361 | A * | 9/1975 | Gardiner | 60/799 |
| 4,034,558 | A * | 7/1977 | Korta | 60/791 |
| 4,387,559 | A * | 6/1983 | Leto | 60/800 |
| 4,425,079 | A * | 1/1984 | Speak et al. | 415/115 |
| 4,668,162 | A * | 5/1987 | Cederwall et al. | 415/115 |
| 4,903,477 | A | 2/1990 | Butt | |
| H0903 | H * | 4/1991 | Weinstein | 60/757 |
| 5,212,940 | A * | 5/1993 | Glover | 60/782 |
| 5,226,278 | A * | 7/1993 | Meylan et al. | 60/752 |
| 5,440,874 | A | 8/1995 | Charier et al. | |
| 5,457,954 | A * | 10/1995 | Boyd et al. | 60/800 |
| 5,555,721 | A * | 9/1996 | Bourneuf et al. | 60/806 |
| 5,862,666 | A * | 1/1999 | Liu | 60/726 |
| 6,163,959 | A | 12/2000 | Arraitz et al. | |
| 6,334,298 | B1 | 1/2002 | Aicholtz | |
| 6,786,052 | B2 * | 9/2004 | Doody | 60/796 |
| 7,013,652 | B2 | 3/2006 | Gebhardt | 60/798 |
| 7,540,153 | B2 | 6/2009 | Tanimura et al. | |
| 7,926,289 | B2 * | 4/2011 | Lee et al. | 60/782 |
| 7,934,382 | B2 * | 5/2011 | Burd | 60/752 |
| 8,127,551 | B2 * | 3/2012 | Commaret et al. | 60/751 |
| 2005/0016182 | A1 * | 1/2005 | Morenko | 60/752 |
| 2005/0050901 | A1 * | 3/2005 | Little | 60/785 |
| 2006/0101801 | A1 * | 5/2006 | Bland | 60/752 |
| 2006/0162336 | A1 * | 7/2006 | Cayre et al. | 60/752 |
| 2008/0141679 | A1 * | 6/2008 | Behaghel et al. | 60/806 |
| 2009/0151361 | A1 * | 6/2009 | Audin et al. | 60/796 |

FOREIGN PATENT DOCUMENTS

| | | | |
|---|---|---|---|
| EP | 1278013 | A3 | 4/2004 |
| GB | 2119861 | A | 11/1983 |
| JP | 6-060702 | U | 8/1994 |
| JP | 07-139372 | A | 5/1995 |
| JP | 11-324796 | A | 11/1999 |
| JP | 2002024631 | A | 1/2002 |
| JP | 2002-039534 | A | 2/2002 |
| JP | 2002303156 | A | 10/2002 |
| JP | 2005-009441 | A | 1/2005 |
| JP | 2006-037855 | A | 2/2006 |
| JP | 2009024631 | A | 2/2009 |

OTHER PUBLICATIONS

Office Action corresponding to CN200880127454.8, dated Sep. 19, 2012.
ISR for PCT/JP2008/073482 mailed Jan. 27, 2009.
Office Action corresponding to JP 2010-500540, dated Oct. 16, 2012.
Notice of Allowance corresponding to KR 10-2010-7018856, dated Sep. 17, 2012.
Notification on the grant of patent right for invention dated Feb. 18, 2014, corresponds to Chinese Patent Application No. 200880127454.8.
Extended European Search Report dated Feb. 18, 2015, corresponding to European patent application No. 08872814.2.

* cited by examiner

GAS TURBINE AND METHOD OF OPENING CHAMBER OF GAS TURBINE

RELATED APPLICATIONS

The present application is based on International Application Number PCT/JP2008/073482, filed Dec. 24, 2008, and claims priority from, Japanese Application Number 2008-046697, filed Feb. 27, 2008.

TECHNICAL FIELD

The present invention relates to a gas turbine and a method of opening a chamber of the gas turbine, and more particularly relates to a gas turbine that includes a divided casing and a method of opening a chamber of the gas turbine.

BACKGROUND ART

Conventionally, as an apparatus that extracts energy from combustion gas generated by burning fuel, there is a gas turbine in which a turbine is rotated by using energy of the combustion gas generated by burning fuel and rotation energy is output from a rotor.

For example, Patent Document 1 discloses a technique in which a valve is installed for supplying external air into an upper cylinder casing, and at the time of suspending an operation of the gas turbine, the external air is introduced from the upper cylinder casing into a cylinder casing to cool the upper cylinder casing, thereby preventing thermal deformation of the cylinder casing.

Patent Document 1: Japanese Patent Application Laid-open No. 2006-37855

DISCLOSURE OF INVENTION

Problem to be Solved by the Invention

In the technique disclosed in Patent Document 1, as shown in FIG. 3 of Patent Document 1, a cylinder casing is divided by a combustor casing and connected to each other by a flange. In the combustor casing, a relatively high-pressure fluid is present among casings formed in a gas turbine. Therefore, according to the technique disclosed in Patent Document 1, a force acting on a divided portion of the casing is not reduced, and, for example, a flange provided at the divided portion may become large.

The present invention has been achieved to solve the above problem, and an object of the present invention is to reduce a force acting on a divided portion of a casing.

Means for Solving Problem

According to an aspect of the present invention, a gas turbine includes: a combustor chamber that houses a combustor unit configured to include a combustor that burns fuel to generate combustion gas for rotating a rotator; a turbine unit chamber that houses a turbine-side rotator, which is the rotator and rotates upon reception of the combustion gas; a combustor casing that forms the combustor chamber; and a casing that is configured to include the combustor casing and in which a divided portion on a surface orthogonal to a rotation axis of the rotator is not formed in the combustor casing, but is formed in a portion on a downstream side of flow of the combustion gas lower than the combustor casing.

According to the above configuration, in the gas turbine according to the present invention, the divided portion is not formed in the combustor casing, but is formed in a portion on a downstream side of the flow of the combustion gas lower than the combustor unit. The pressure of the combustion gas present in the casing on the downstream side of the flow of the combustion gas lower than the combustor is lower than that of the combustion gas present in the combustor chamber formed inside of the combustor casing.

Therefore, in the gas turbine, the force acting on the divided portion due to the pressure of the fluid is reduced. Accordingly, in the gas turbine, the divided portion can be downsized. Further, at the time of transportation of the gas turbine, the casing is transported by a transport vehicle. At this time, the size of the casing is limited to a size that can be transported. In the gas turbine, the casing is also downsized to the extent that the flange formed at the divided portion is downsized. Accordingly, the gas turbine can suppress a possibility that the casing exceeds the limit.

Advantageously, in the gas turbine, the divided portion is formed in a portion of the turbine unit chamber.

According to the above configuration, in the gas turbine according to the present invention, the divided portion is not formed in the combustor casing, but is formed in the turbine unit chamber, which is a portion on the downstream side of the combustion gas flow lower than the combustor. The pressure of the combustion gas present in the casing of the turbine unit chamber, which is the portion on the downstream side of the combustion gas flow lower than the combustor, is lower than that of the combustion gas present in the combustor chamber formed inside of the combustor casing.

Therefore, in the gas turbine, the force acting on the divided portion due to the pressure of the fluid is reduced. Accordingly, in the gas turbine, a flange formed at the divided portion can be downsized. Further, the gas turbine can suppress a possibility that the casing exceeds the limit.

Advantageously, the gas turbine includes a turbine-unit rotor blade that constitutes the turbine; a cooling air chamber provided inside of the turbine unit chamber and radially outside of the rotation axis of the turbine-unit rotor blade, to which cooling air for cooling the turbine is supplied; and a partition member that protrudes toward an inner periphery of the casing along a surface orthogonal to the rotation axis and divides the cooling air chamber. The divided portion is formed in the casing at a portion opposite to the partition member.

Generally, in the gas turbine, a cooling-air introducing hole for guiding the cooling air to the cooling air chamber is formed in the casing between two adjacent partition members. In the gas turbine according to the present invention, the divided portion is formed in the casing at a portion opposite to the partition member. Accordingly, in the gas turbine, the divided portion is provided to avoid the cooling-air introducing hole formed in the casing.

Advantageously, in the gas turbine, the cooling air chamber is configured to include a first cooling-air chamber arranged closest to the combustor chamber and a second cooling-air chamber adjacent to the first cooling-air chamber, and the divided portion is formed in the casing at a portion opposite to the partition member that divides the cooling air chamber into the first cooling-air chamber and the second cooling-air chamber.

According to the above configuration, in the gas turbine according to the present invention, the divided portion is not formed in the combustor casing, but is formed in the first cooling-air chamber and the second cooling-air chamber of the turbine unit chamber, which is the portion on the downstream side of the combustion gas flow lower than the combustor. The pressure of the cooling air present in the first cooling-air chamber and the second cooling-air chamber, which are the portions on the downstream side of the combustion gas flow lower than the combustor, is lower than that of the combustion gas present in the combustor chamber formed inside of the combustor casing.

Therefore, in the gas turbine, the force acting on the divided portion due to the pressure of the fluid is reduced. Accordingly, in the gas turbine, the flange formed at the divided portion can be downsized. Further, the gas turbine can suppress a possibility that the casing exceeds the limit. In the gas turbine, the divided portion is formed in the casing at the portion opposite to the partition member. Therefore, in the gas turbine, the divided portion is provided to avoid the cooling-air introducing hole formed in the casing.

Advantageously, in the gas turbine, at least one member among members constituting the combustor casing is fixed to the combustor unit by a connecting member that is provided only at outside of the combustor chamber.

According to the above configuration, in the gas turbine according to the present invention, at least a part of the members constituting the combustor casing is detached from outside of the combustor chamber. Accordingly, in the gas turbine, the member constituting the combustor casing is detached from the casing at the time of maintenance.

Advantageously, the gas turbine includes a load coupling cover having a portion fitted into the casing and supported inside of the combustor chamber, and supporting the combustor in the combustor unit.

According to the above configuration, the load coupling cover of the gas turbine according to the present invention has a portion fitted into the casing, and thus it is not fixed completely to the casing by a bolt, for example. Therefore, in the gas turbine, for example, at the time of maintenance, the casing is detached without a need for a worker to enter into the combustor chamber and access a connecting portion between the casing and the load coupling cover.

Accordingly, because the gas turbine includes the load coupling cover having the portion fitted into the casing, the number of working processes required at the time of maintenance of the gas turbine is reduced. Accordingly, the gas turbine can reduce manpower required with respect to workers at the time of maintenance. Further, the gas turbine can reduce working hours required at the time of maintenance.

According to another aspect of the present invention, a method of opening a chamber of a gas turbine includes a combustor chamber that houses a combustor unit configured to include a combustor that burns fuel to generate combustion gas for rotating a rotator, a turbine unit chamber that houses a turbine-side rotator, which is the rotator and rotates upon reception of the combustion gas, a combustor casing that forms the combustor chamber, and a casing that is configured to include the combustor casing and in which a divided portion on a surface orthogonal to a rotation axis of the rotator is not formed in the combustor casing, but is formed in a portion on a downstream side of flow of the combustion gas lower than the combustor casing. At least a part of members constituting a combustor casing is detached from outside of a combustor chamber, at a time of opening the chamber of the gas turbine.

According to the above configuration, as the method of opening a chamber of a gas turbine according to the present invention is used, at least a part of the members constituting the combustor casing is detached from outside of the combustor chamber. With this arrangement, for example, at the time of maintenance, the chamber of the gas turbine can be opened by detaching at least a part of the members constituting the combustor casing from outside of the combustor chamber.

Advantageously, in the method of opening a chamber of a gas turbine, at least a part of the members constituting the combustor casing is detached from outside of the combustor chamber, without detaching a load coupling cover having a portion fitted into the casing and supported inside of the combustor chamber, and supporting the combustor in the combustor unit.

According to the above configuration, as the method of opening a chamber of a gas turbine according to the present invention is used, the load coupling cover is only fitted into the casing, and is not fixed to the casing by a bolt, for example. Therefore, for example, at the time of maintenance, a worker does not need to enter into the combustor chamber and access a connecting portion between the casing and the load coupling cover. Accordingly, for example, at the time of maintenance, the chamber of the gas turbine can be opened only by detaching the casing, without detaching the load coupling cover.

Effect of the Invention

The present invention can reduce a force acting on a divided portion of a casing.

Figure 1:
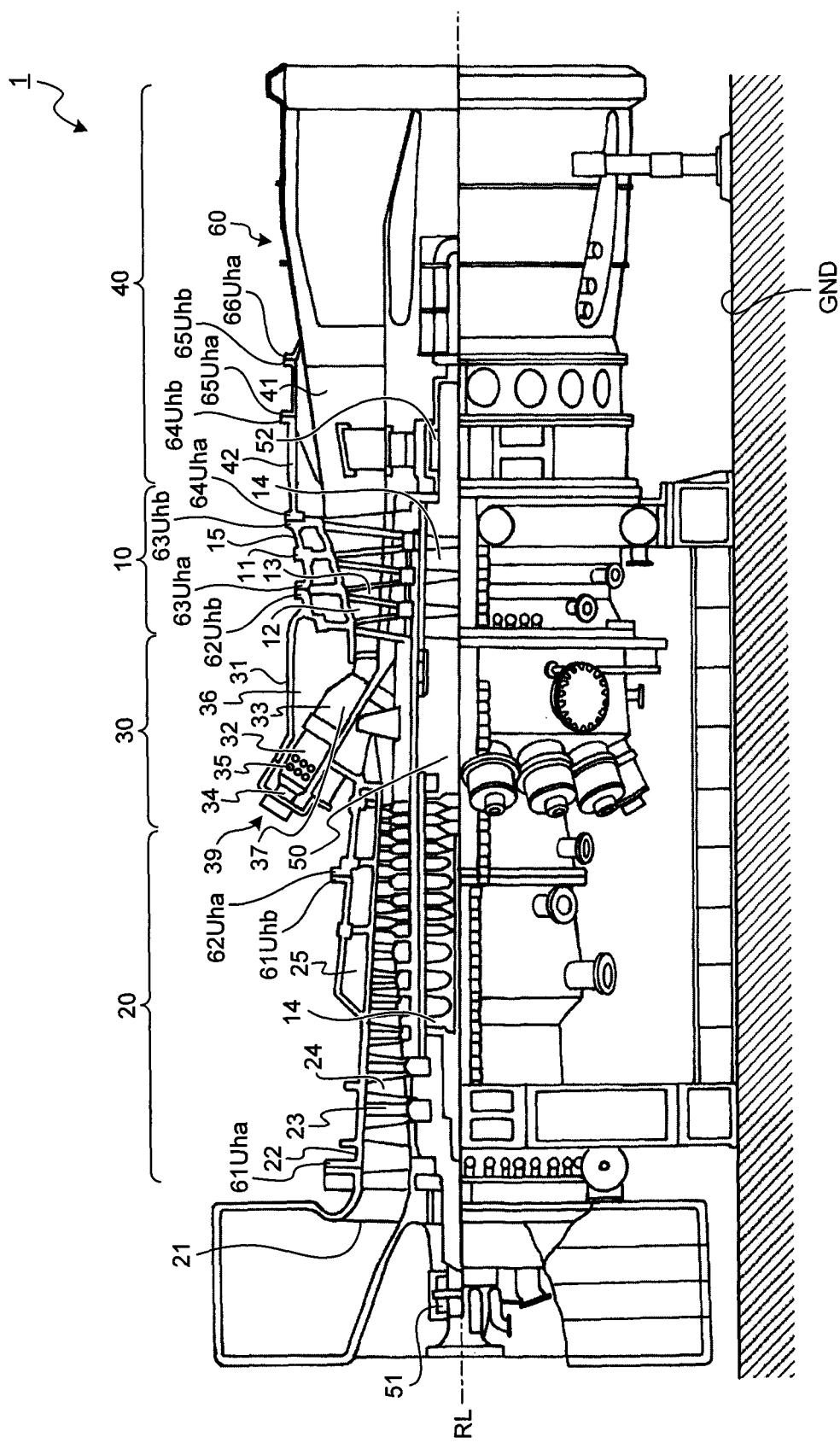
FIG. 1 is a schematic configuration diagram of a gas turbine according to a first embodiment.

EXPLANATIONS OF LETTERS OR NUMERALS 1, 2, 3 gas turbine
10 turbine unit
11 turbine unit chamber
12 turbine unit nozzle
13 turbine-unit rotor blade
14 disk
15 turbine unit casing
20 compressor unit
21 air inlet
22 compressor casing
23 compressor vane
24 compressor rotor blade
25 air bleed manifold
30 combustor unit
31 combustor casing
32 combustor liner 33 transition piece
34 fuel nozzle
35 combustor-liner air inlet
36 combustor chamber
37 combustion zone
38 load coupling cover
38a engaging unit of load coupling cover
38b bolt
39 combustor
40 exhaust unit
41 exhaust diffuser
42 exhaust casing
50 rotor
51 bearing
52 bearing
60 casing
60D lower casing
60U upper casing
61D first lower casing
61Dha first upper-side first longitudinal-flange
61Dhb first lower-side second longitudinal-flange
61U first upper casing
61Uha first upper-side first longitudinal-flange
61Uhb first upper-side second longitudinal-flange
62D second lower casing
62Dhb second lower-side second longitudinal-flange
62U second upper casing
62Uc engaging unit of second member
262Uha second upper-side first longitudinal-flange
62Uhb second upper-side second longitudinal-flange
63D third lower casing
63Dha third lower-side first longitudinal-flange
63Dhb third lower-side second longitudinal-flange
63U third upper casing
63Uha third upper-side first longitudinal-flange
63Uhb third upper-side second longitudinal-flange
64D fourth lower casing
64Dha fourth lower-side first longitudinal-flange
64Dhb fourth lower-side second longitudinal-flange
64U fourth upper casing
64Uha fourth upper-side first longitudinal-flange
64Uhb fourth upper-side second longitudinal-flange
65D fifth lower casing
65Dha fifth lower-side first longitudinal-flange
65Dhb fifth lower-side second longitudinal-flange
65U fifth upper casing
65Uha fifth upper-side first longitudinal-flange
65Uhb fifth upper-side second longitudinal-flange
66D sixth lower casing
66Dha sixth lower-side first longitudinal-flange
66U sixth upper casing
66Uha sixth upper-side first longitudinal-flange
67 turbine diaphragm
67a partition wall
68 cooling-air introducing hole
69 cooling-air chamber
69a first cooling-air chamber
69b second cooling-air chamber
69c third cooling-air chamber

BEST MODE(S) FOR CARRYING OUT THE INVENTION

The present invention is explained below in detail with reference to the accompanying drawings. The present invention is not limited to best modes for carrying out the invention (hereinafter, "embodiments"). In addition, constituent elements in the embodiments include those that can be easily assumed by persons skilled in the art, that are substantially equivalent, and so-called equivalents.

(First Embodiment)

FIG. 1 is a schematic configuration diagram of a gas turbine according to a first embodiment. As shown in FIG. 1, a gas turbine 1 according to the first embodiment includes a compressor unit 20, a combustor unit 30, a turbine unit 10, and an exhaust unit 40 in order from an upstream side to a downstream side of flow of a fluid.

The compressor unit 20 pressurizes a fluid and feeds the pressurized fluid to the combustor unit 30. The combustor unit 30 supplies fuel to the pressurized fluid to burn the fuel. The turbine unit 10 converts energy of combustion gas fed from the combustor unit 30 to rotation energy. The exhaust unit 40 discharges the combustion gas into the atmosphere.

The compressor unit 20 includes an air inlet 21, a compressor casing 22, a compressor vane 23, a compressor rotor blade 24, and an air bleed manifold 25. The air inlet 21 takes in air from the atmosphere into the compressor casing 22.

A plurality of compressor vanes 23 and a plurality of compressor rotor blades 24 are alternatively provided in the compressor casing 22. The air bleed manifold 25 is provided at outside of the compressor vanes 23 and the compressor rotor blades 24, to guide the air compressed by the compressor unit 20 to the combustor unit 30.

The combustor unit 30 includes a combustor casing 31 and a combustor 39. A combustor chamber 36 is formed in the combustor casing 31. The combustor 39 includes a combustor liner 32, a transition piece 33, a fuel nozzle 34, and a combustor-liner air inlet 35. The combustor liner 32 is formed in a substantially cylindrical shape and provided in the combustor chamber 36 as a compressed air passage. In addition, the transition piece 33 is provided in the combustor chamber 36 as the compressed air passage. The transition piece 33 is formed in a cylindrical shape, and a combustion zone 37 for burning the fuel is formed in the transition piece 33.

One end of the combustor liner 32 in the axial direction is connected to the transition piece 33. The fuel nozzle 34 that injects fuel into the combustor liner 32 is provided at the other end of the combustor liner 32 on the side opposite to the transition piece 33. A plurality of combustor-liner air inlets 35 that introduce the compressed air into the combustor liner 32 are formed on an outer peripheral surface of the combustor liner 32.

The fuel is injected from the fuel nozzle 34 to the compressed air introduced into the combustor liner 32 via the combustor-liner air inlets 35, and guided to the combustion zone 37 in the transition piece 33. The fuel introduced into the combustion zone 37 is ignited by a burner and burns to become combustion gas having kinetic energy.

The turbine unit 10 includes a turbine unit chamber 11, a turbine unit nozzle 12, and a turbine-unit rotor blade 13 as a turbine-side rotator in a turbine unit casing 15. A plurality of turbine unit nozzles 12 and a plurality of turbine-unit rotor blades 13 are alternatively arranged in the turbine unit chamber 11. The exhaust unit 40 includes an exhaust diffuser 41 inside of an exhaust casing 42. The exhaust diffuser 41 is connected to the turbine unit 10, and converts a dynamic pressure of the combustion gas, that is, flue gas having passed through the turbine unit 10 to a static pressure.

The gas turbine 1 has a rotor 50 as a rotator. The rotor 50 is provided to penetrate through the central part of the compressor unit 20, the combustor unit 30, the turbine unit 10, and the exhaust unit 40. An end of the rotor 50 on the compressor unit 20 side is rotatably supported by a bearing 51, and an end thereof on the exhaust unit 40 side is rotatably supported by a bearing 52.

The rotor 50 is provided inside a casing 60 to rotate about a rotation axis RL. The rotor 50 includes a plurality of disks 14 as the turbine-side rotator. The compressor rotor blades 24 and the turbine-unit rotor blades 13 are respectively connected to the disks 14. A rotation shaft of a power generator (not shown) is connected to the end of the rotor 50 on the compressor unit 20 side.

According to the above configuration, the air taken in from the air inlet 21 in the compressor unit 20 is compressed by the compressor vanes 23 and the compressor rotor blades 24 to become high-temperature and high-pressure compressed air. Subsequently, predetermined fuel is supplied to the compressed air in the combustor unit 30, and the fuel burns.

The energy of the high-temperature and high-pressure combustion gas, which is a working fluid generated in the combustor unit 30, is converted to the rotation energy at the time of passing through the turbine unit nozzles 12 and the turbine-unit rotor blades 13 constituting the turbine unit 10. The rotation energy is transmitted to the rotor 50 via the turbine-unit rotor blades 13 to rotate the rotor 50. Accordingly, the gas turbine 1 drives the power generator connected to the rotor 50. The flue gas having passed through the turbine unit 10 is released into the atmosphere, with the dynamic pressure being converted to the static pressure by the exhaust diffuser 41 in the exhaust unit 40.

Figure 2:
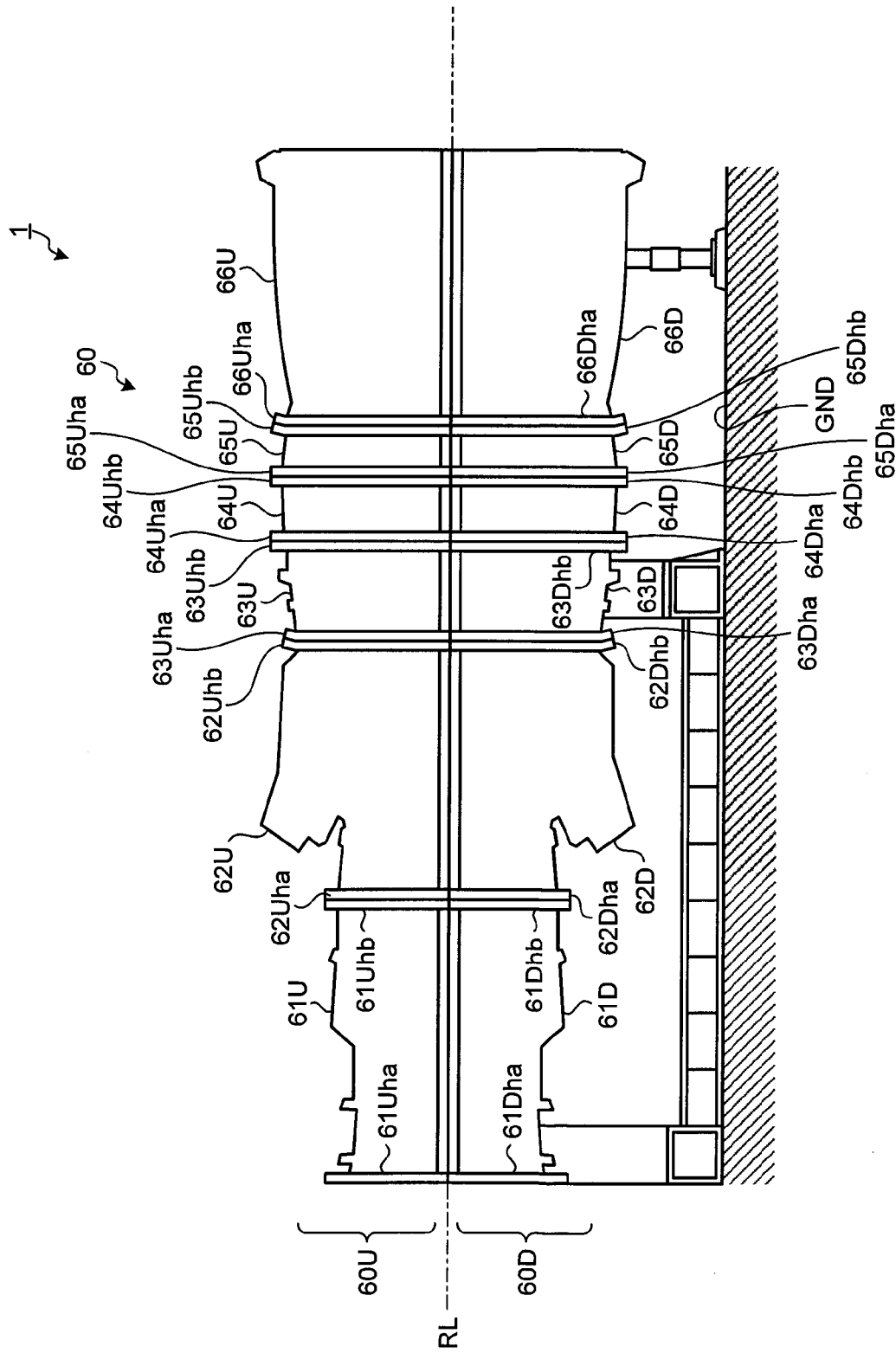
FIG. 2 is a schematic sectional view of a configuration of a casing of the gas turbine according to the first embodiment.

FIG. 2 is a schematic sectional view of a configuration of the casing of the gas turbine according to the first embodiment. The gas turbine 1 has a feature in the configuration of the casing 60. The casing 60 is divided as shown in FIG. 2 based on a size limit of a machine tool used for production and a size limit set at the time of transportation.

The casing 60 is divided on a surface including the rotation axis RL of the rotor 50 shown in FIG. 1. As shown in FIG. 2, the casing 60 on a ground GND side is designated as a lower casing 60D and the casing 60 farther from the ground GND than the lower casing 60D is designated as an upper casing 60U at the time of installing the gas turbine 1.

The casing 60 is divided on a surface orthogonal to the rotation axis RL. The casing 60 is divided into, for example, six parts on the surface orthogonal to the rotation axis RL. Accordingly, the casing 60 is divided into 12 parts in total with a division on the surface including the rotation axis RL.

The upper casing 60U includes a first upper casing 61U, a second upper casing 62U, a third upper casing 63U, a fourth upper casing 64U, a fifth upper casing 65U, and a sixth upper casing 66U in order from the upstream side of the flow of air or combustion gas flowing in the gas turbine 1.

The lower casing 60D includes a first lower casing 61D, a second lower casing 62D, a third lower casing 63D, a fourth lower casing 64D, a fifth lower casing 65D, and a sixth lower casing 66D in order from the upstream side of the flow air or combustion gas flowing in the gas turbine 1. The air or combustion gas is hereinafter simply referred to as a fluid.

The member of the casing 60 divided into 12 parts is assembled by connecting formed flanges with each other by bolts, for example. A flange formed at the divided portion on the surface including the rotation axis RL is referred to as a lateral flange. That is, the lateral flange is formed parallel to the rotation axis RL.

The first upper casing 61U and the first lower casing 61D are connected to each other by the lateral flange with no space therebetween. The second upper casing 62U and the second lower casing 62D are connected to each other by the lateral flange with no space therebetween. The third upper casing 63U and the third lower casing 63D are connected to each other by the lateral flange with no space therebetween. The fourth upper casing 64U and the fourth lower casing 64D are connected to each other by the lateral flange with no space therebetween. The fifth upper casing 65U and the fifth lower casing 65D are connected to each other by the lateral flange with no space therebetween. The sixth upper casing 66U and the sixth lower casing 66D are connected to each other by the lateral flange with no space therebetween.

A flange formed at the divided portion on the surface orthogonal to the rotation axis RL is referred to as a longitudinal flange. The longitudinal flange is formed along a circumferential direction on a side periphery of the casing 60. A first upper-side first longitudinal-flange 61Uha formed at one end of the first upper casing 61U is connected to an opening of the air inlet 21 shown in FIG. 1.

A first upper-side second longitudinal-flange 61Uhb formed at the other end of the first upper casing 61U is connected to a second upper-side first longitudinal-flange 62Uha formed at one end of the second upper casing 62U with no space therebetween. Accordingly, the first upper casing 61U and the second upper casing 62U are connected to each other.

A second upper-side second longitudinal-flange 62Uhb formed at the other end of the second upper casing 62U is connected to a third upper-side first longitudinal-flange 63Uha formed at one end of the third upper casing 63U with no space therebetween. Accordingly, the second upper casing 62U and the third upper casing 63U are connected to each other.

A third upper-side second longitudinal-flange 63Uhb formed at the other end of the third upper casing 63U is connected to a fourth upper-side first longitudinal-flange 64Uha formed at one end of the fourth upper casing 64U with no space therebetween. Accordingly, the third upper casing 63U and the fourth upper casing 64U are connected to each other.

A fourth upper-side second longitudinal-flange 64Uhb formed at the other end of the fourth upper casing 64U is connected to a fifth upper-side first longitudinal-flange 65Uha formed at one end of the fifth upper casing 65U with no space therebetween. Accordingly, the fourth upper casing 64U and the fifth upper casing 65U are connected to each other.

A fifth upper-side second longitudinal-flange 65Uhb formed at the other end of the fifth upper casing 65U is connected to a sixth upper-side first longitudinal-flange 66Uha formed at one end of the sixth upper casing 66U with no space therebetween. Accordingly, the fifth upper casing 65U and the sixth upper casing 66U are connected to each other.

A first upper-side first longitudinal-flange 61Dha formed at one end of the first lower casing 61D is connected to the opening of the air inlet 21 shown in FIG. 1. A first lower-side second longitudinal-flange 61Dhb formed at the other end of the first lower casing 61D is connected to a second lower-side first longitudinal-flange 62Dha formed at one end of the second lower casing 62D with no space therebetween. Accordingly, the first lower casing 61D and the second lower casing 62D are connected to each other.

A second lower-side second longitudinal-flange 62Dhb formed at the other end of the second lower casing 62D is connected to a third lower-side first longitudinal-flange 63Dha formed at one end of the third lower casing 63D with no space therebetween. Accordingly, the second lower casing 62D and the third lower casing 63D are connected to each other.

A third lower-side second longitudinal-flange 63Dhb formed at the other end of the third lower casing 63D is connected to a fourth lower-side first longitudinal-flange 64Dha formed at one end of the fourth lower casing 64D with no space therebetween. Accordingly, the third lower casing 63D and the fourth lower casing 64D are connected to each other.

A fourth lower-side second longitudinal-flange 64Dhb formed at the other end of the fourth lower casing 64D is connected to a fifth lower-side first longitudinal-flange 65Dha formed at one end of the fifth lower casing 65D with no space therebetween. Accordingly, the fourth lower casing 64D and the fifth lower casing 65D are connected to each other.

A fifth lower-side second longitudinal-flange 65Dhb formed at the other end of the fifth lower casing 65D is connected to a sixth lower-side first longitudinal-flange 66Dha formed at one end of the sixth lower casing 66D with no space therebetween. Accordingly, the fifth lower casing 65D and the sixth lower casing 66D are connected to each other.

In the casing 60, as described above, the first upper casing 61U, the second upper casing 62U, the third upper casing 63U, the fourth upper casing 64U, the fifth upper casing 65U, the sixth upper casing 66U, the first lower casing 61D, the second lower casing 62D, the third lower casing 63D, the fourth lower casing 64D, the fifth lower casing 65D, and the sixth lower casing 66D are assembled with each other.

Figure 3:
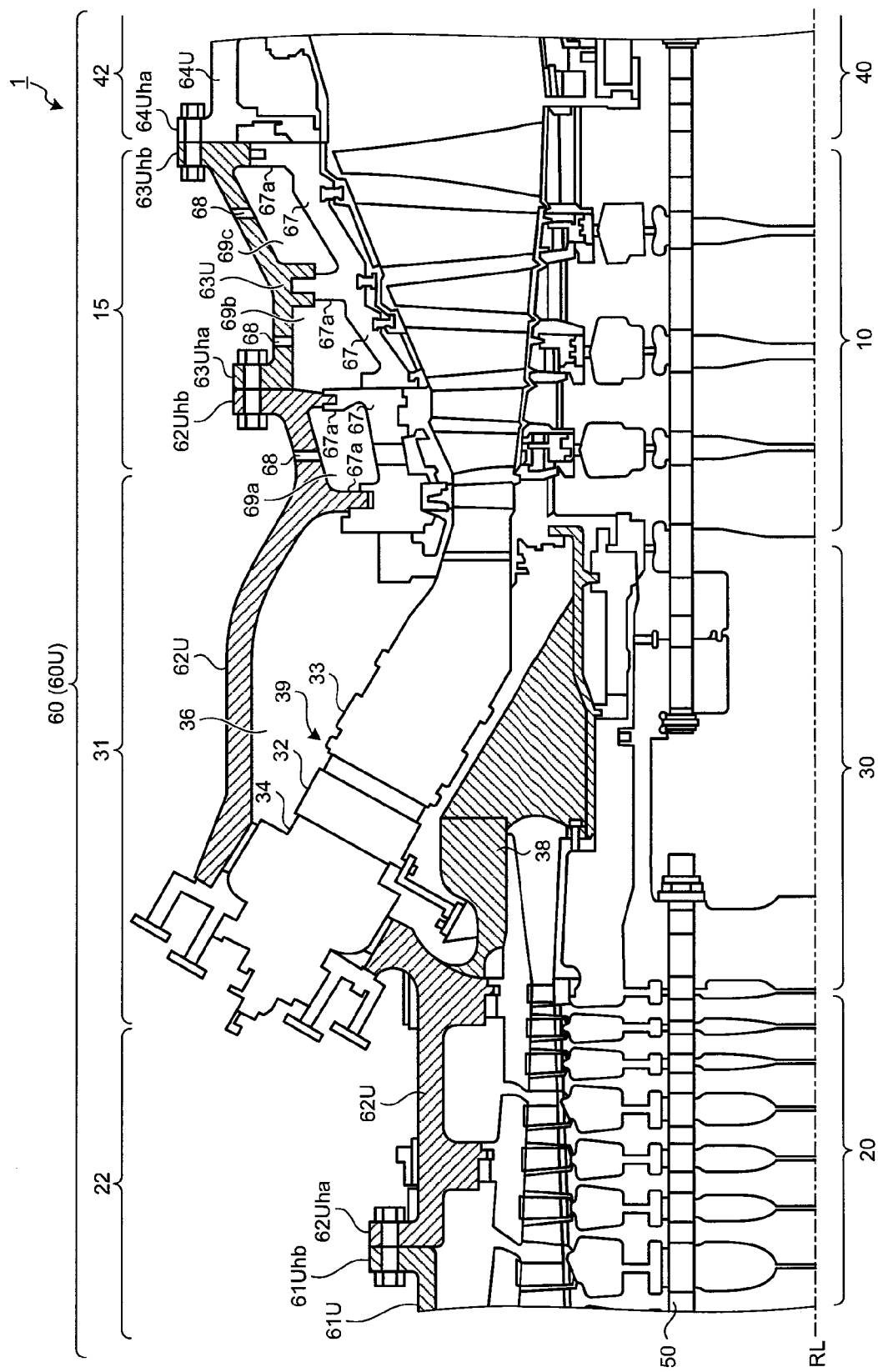
FIG. 3 is a schematic sectional view of a configuration of the casing of the gas turbine according to the first embodiment.

FIG. 3 is a schematic sectional view of a configuration of the casing of the gas turbine according to the first embodiment. The gas turbine 1 has a feature in the configuration of the casing 60. The casing 60 is divided based on the size limit of the machine tool used for production and the size limit set at the time of transportation. Because the upper casing 60U and the lower casing 60D constituting the casing 60 have substantially the same configuration, FIG. 3 depicts only the upper casing 60U of the casing 60.

As shown in FIG. 3, the casing 60 includes the compressor casing 22, the combustor casing 31, the turbine unit casing 15, and the exhaust casing 42. The configuration of the respective parts of the casing 60 is explained with reference to FIGS. 2 and 3. The compressor casing 22 includes the divided portion on the surface orthogonal to the rotation axis RL by the first upper casing 61U and the first lower casing 61D, and the second upper casing 62U and the second lower casing 62D.

The combustor casing 31 includes the second upper casing 62U and the second lower casing 62D. The turbine unit casing 15 includes the divided portion on the surface orthogonal to the rotation axis RL by the second upper casing 62U and the second lower casing 62D, and the third upper casing 63U and the third lower casing 63D. The exhaust casing 42 includes the fourth upper casing 64U and the fourth lower casing 64D.

Divided portions between the first upper-side second longitudinal-flange 61Uhb and the first lower-side second longitudinal-flange 61Dhb, and the second upper-side first longitudinal flange 62Uha and the second lower-side first longitudinal flange 62Dha are respectively formed, for example, in the compressor unit 20.

Divided portions between the second upper-side second longitudinal-flange 62Uhb and the second lower-side second longitudinal-flange 62Dhb, and the third upper-side first longitudinal flange 63Uha and the third lower-side first longitudinal flange 63Dha are respectively formed, for example, in the turbine unit 10.

Divided portions between the third upper-side second longitudinal-flange 63Uhb and the third lower-side second longitudinal-flange 63Dhb, and the fourth upper-side first longitudinal flange 64Uha and the fourth lower-side first longitudinal flange 64Dha are respectively formed, for example, at a boundary between the turbine unit 10 and the exhaust unit 40.

The turbine unit 10 includes, for example, three cooling-air chambers 69, to which cooling air for cooling the respective parts of the turbine unit 10 is guided. The cooling-air chamber 69 includes the turbine unit casing 15 and a turbine diaphragm 67.

The turbine diaphragm 67 is a cylindrical member, in which the turbine unit nozzles 12, the turbine-unit rotor blades 13, and the like are provided in a hollow portion thereof. That is, the turbine diaphragm 67 is provided at radially outside of the turbine unit nozzles 12 and the turbine-unit rotor blades 13. Partition walls 67a as a partition member are formed protruding radially outside of the turbine diaphragm 67. Specifically, the cooling-air chamber 69 is a space surrounded by an inner periphery of the turbine unit casing 15, a side periphery of the turbine diaphragm 67, and the partition wall 67a.

The cooling-air chamber 69 includes, for example, three chambers of a first cooling-air chamber 69a, a second cooling-air chamber 69b, and a third cooling-air chamber 69c. The first cooling-air chamber 69a is closest to the combustor unit 30 of the three cooling-air chambers 69. The third cooling-air chamber 69c is closest to the exhaust unit 40 of the three cooling-air chambers 69. The second cooling-air chamber 69b is arranged between the first cooling-air chamber 69a and the third cooling-air chamber 69c.

A plurality of cooling-air introducing holes 68 penetrating outside and inside of the turbine unit casing 15 are formed on a side periphery of the turbine unit casing 15. The cooling-air introducing holes 68 respectively open in the first cooling-air chamber 69a, the second cooling-air chamber 69b, and the third cooling-air chamber 69c. The cooling-air introducing hole 68 guides cooling air to the cooling-air chamber 69. Specifically, the cooling-air introducing hole 68 is formed in the turbine unit casing 15 between the two adjacent partition walls 67a.

The divided portion provided with the second upper-side second-longitudinal flange 62Uhb and the third upper-side first longitudinal-flange 63Uha is formed in the turbine unit 10 as shown in FIG. 3. More specifically, the divided portion provided with the second upper-side second longitudinal-flange 62Uhb and the third upper-side first longitudinal-flange 63Uha is formed in a portion opposite to the partition wall 67a between the first cooling-air chamber 69a and the second cooling-air chamber 69b.

The pressure of air present in the first cooling-air chamber 69a is lower than that of the fluid present in the combustor chamber 36. Further, the pressure of air present in the second cooling-air chamber 69b is lower than that of the fluid present in the combustor chamber 36.

Figure 4:
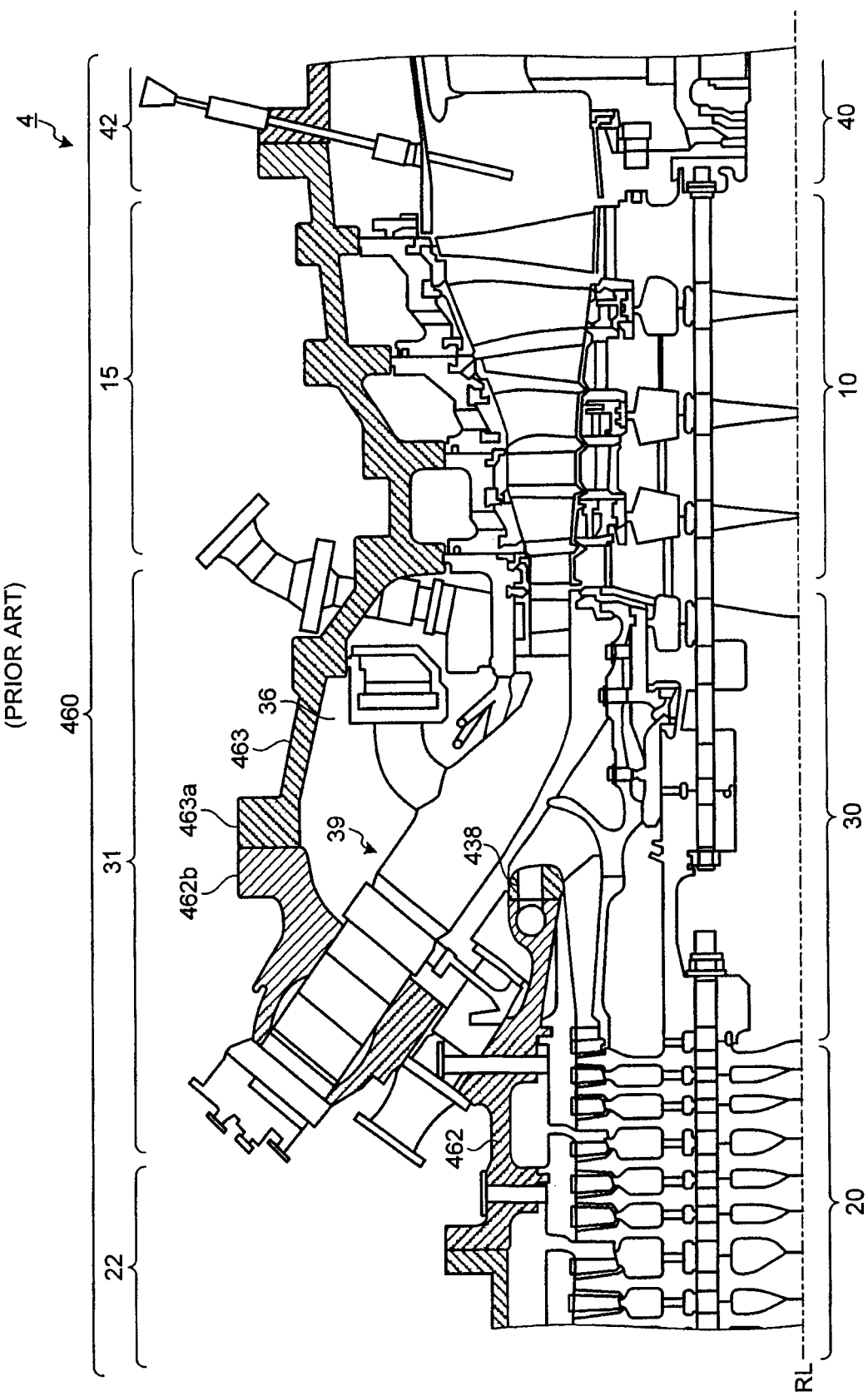
FIG. 4 is a schematic sectional view of a configuration of a casing of a conventional gas turbine.

FIG. 4 is a schematic sectional view of a configuration of a casing of a conventional gas turbine. In a conventional gas turbine 4, a second longitudinal flange 462b of a second member and a first longitudinal flange 463a of a third member, which form a connecting portion between a second member 462 and a third member 463 constituting a casing 460, are formed in the combustor unit 30.

On the other hand, as shown in FIG. 3, in the gas turbine 1, a connecting portion between the second upper-side second longitudinal-flange 62Uhb and the third upper-side first longitudinal-flange 63Uha is not provided in the combustor unit 30. In the gas turbine 1, further, a connecting portion between the second lower-side second longitudinal-flange 62Dhb and the third lower-side first longitudinal-flange 63Dha shown in FIG. 2 is not provided in the combustor unit 30 shown in FIG.

1. That is, the casing 60 of the gas turbine 1 is not divided on the surface orthogonal to the rotation axis RL in the combustor unit 30.

As described above, the pressure of the fluid present in the first cooling-air chamber 69*a* is lower than that of the fluid present in the combustor chamber 36. Further, the pressure of the fluid present in the second cooling-air chamber 69*b* is lower than that of the fluid present in the combustor chamber 36. Therefore, in the gas turbine shown in FIGS. 2 and 3, a force acting on the second upper-side second longitudinal-flange 62Uhb and the second lower-side second longitudinal-flange 62Dhb, and the third upper-side first longitudinal-flange 63Uha and the third lower-side first longitudinal-flange 63Dha is smaller than that in the gas turbine 4 shown in FIG. 4.

Accordingly, in the gas turbine 1, the second upper-side second longitudinal-flange 62Uhb and the second lower-side second longitudinal-flange 62Dhb, and the third upper-side first longitudinal-flange 63Uha and the third lower-side first longitudinal-flange 63Dha can be downsized.

At the time of transportation of the gas turbine 1, the casing 60 is transported by a transport vehicle. At this time, the size of the casing 60 is limited to a size that can be transported. As described above, the second upper-side second longitudinal-flange 62Uhb and the second lower-side second longitudinal-flange 62Dhb, and the third upper-side first longitudinal-flange 63Uha and the third lower-side first longitudinal-flange 63Dha of the gas turbine 1 are downsized. Therefore, the gas turbine 1 can suppress a possibility that the casing 60 exceeds the limit.

The second upper-side second longitudinal-flange 62Uhb, the second lower-side second longitudinal-flange 62Dhb, the third upper-side first longitudinal-flange 63Uha, and the third lower-side first longitudinal-flange 63Dha are formed in a portion where the partition wall 67*a* between the first cooling-air chamber 69*a* and the second cooling-air chamber 69*b* is formed.

Accordingly, in the gas turbine 1, the second upper-side second longitudinal-flange 62Uhb, the second lower-side second longitudinal-flange 62Dhb, the third upper-side first longitudinal-flange 63Uha, and the third lower-side first longitudinal-flange 63Dha are provided to avoid the cooling-air introducing holes 68 formed in the turbine unit casing 15 between the two adjacent partition walls 67*a*.

The flange is formed at the divided portion of the casing 60 shown in FIG. 2; however, the first embodiment is not limited thereto. For example, the flange may not be formed at the divided portion of the casing 60, and the divided portion can be bonded by welding.

In the gas turbine 1, the pressure of the fluid in the divided portion is lower than that of the fluid in the combustor chamber 36. Therefore, in the gas turbine 1, a force acting on the divided portion is reduced. Accordingly, in the gas turbine 1, the strength required for a weld is reduced.

Figure 5:
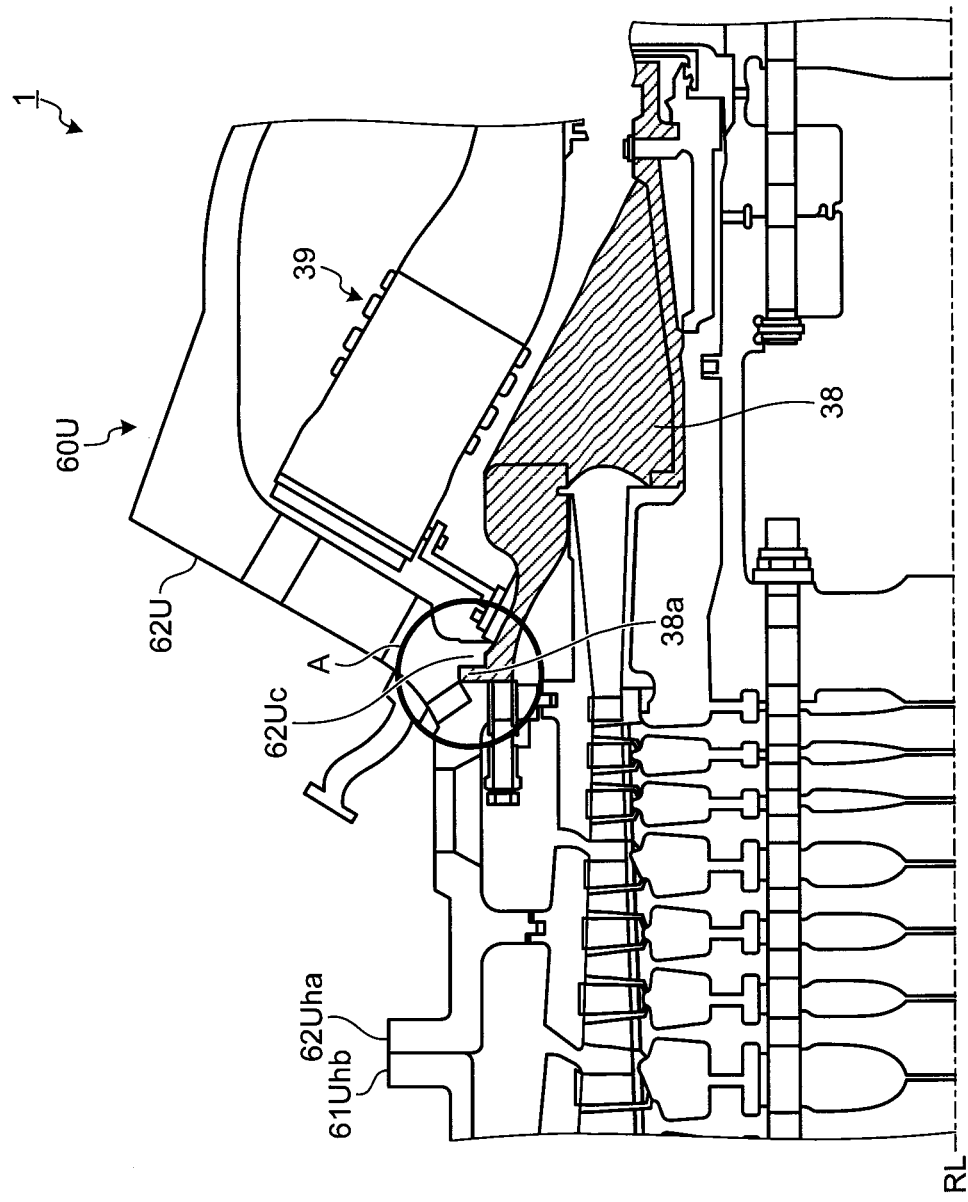
FIG. 5 is an enlarged schematic sectional view of a load coupling cover on an upper casing side according to the first embodiment.
Figure 6:
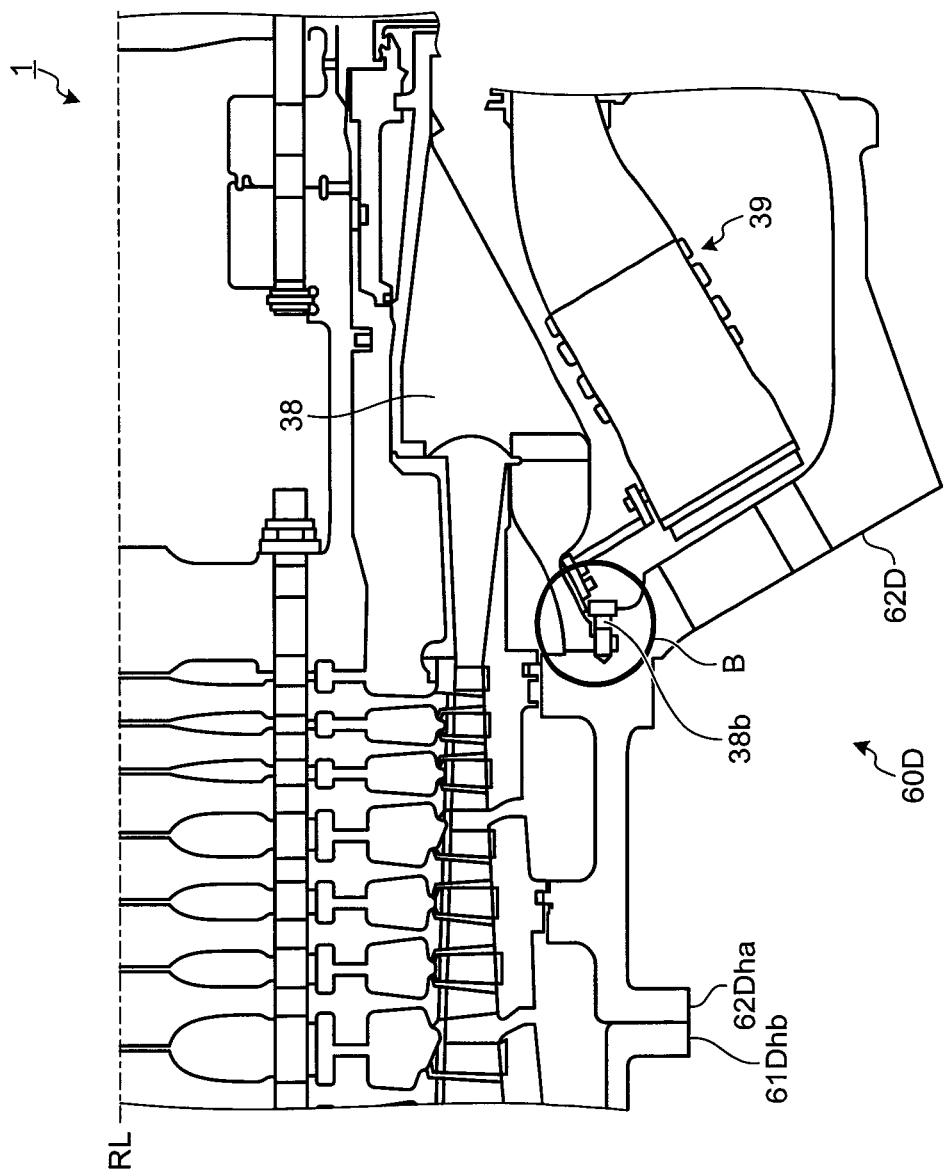
FIG. 6 is an enlarged schematic sectional view of a load coupling cover on a lower casing side according to the first embodiment.

FIG. 5 is an enlarged schematic sectional view of a load coupling cover on the upper casing side according to the first embodiment. FIG. 6 is an enlarged schematic sectional view of the load coupling cover on the lower casing side according to the first embodiment.

As shown in FIG. 5, the combustor 39 in the combustor unit 30 is supported by a load coupling cover 38. In this case, a load coupling cover 438 of the conventional gas turbine 4 shown in FIG. 4 is completely fixed to the casing 460 by a bolt, for example.

On the other hand, the load coupling cover 38 shown in FIG. 5 is not fixed to the second upper casing 62U of the upper casing 60U. As shown in a part A in FIG. 5, in the load coupling cover 38, an engaging unit 38*a* of the load coupling cover formed in the load coupling cover 38 and an engaging unit 62Uc of the second member formed in the second upper casing 62U are fitted to each other.

As shown in a part B in FIG. 6, the load coupling cover 38 is fixed to the second lower casing 62D of the lower casing 60D by a bolt 38*b*. The upper casing 60U shown in FIG. 5 is detached at the time of maintenance of the gas turbine 1; however, the lower casing 60D shown in FIG. 6 is not detached at the time of maintenance of the gas turbine 1.

Therefore, the load coupling cover 38 is sufficiently fixed by the bolt 38*b* to the second lower casing 62D of the lower casing 60D, which is not detached at the time of maintenance, and is fitted into the upper casing 60U, which is detached at the time of maintenance, by the engaging unit 38*a* of the load coupling cover and the engaging unit 62Uc of the second member.

In the gas turbine 4 shown in FIG. 4, the third member 463 is detached first at the time of maintenance. A worker then enters into the combustor chamber 36 to remove a bolt at the connecting portion between the second member 462 and the load coupling cover 438. The second member 462 of the gas turbine 4 is then detached. Accordingly, the combustor 39 of the gas turbine 4 is exposed at the time of maintenance.

On the other hand, in the gas turbine 1 shown in FIGS. 3, 5, and 6, the second upper casing 62U of the upper casing 60U shown in FIG. 5 is first detached at the time of maintenance. At this time, the load coupling cover 38 is only fitted into the second upper casing 62U of the upper casing 60U, and is not fixed by a bolt to the second upper casing 62U of the upper casing 60U.

Therefore, according to the gas turbine 1, a worker does not need to enter into the combustor chamber 36 to access a connecting portion between the second upper casing 62U and the load coupling cover 38 at the time of maintenance. Therefore, in the gas turbine 1, only the second upper casing 62U of the upper casing 60U is detached from the gas turbine 1 to expose the combustor 39 at the time of maintenance.

As described above, the gas turbine 1 includes the load coupling cover 38 fitted into the upper casing 60U to reduce the number of working processes required for the maintenance of the gas turbine 1. Accordingly, the gas turbine 1 can reduce manpower required with respect to workers at the time of maintenance. Further, the gas turbine 1 can reduce working hours required at the time of maintenance.

The load coupling cover 38 is not limited to a fitting type, which is fitted into the upper casing 60U. For example, the load coupling cover 38 can be fixed to the second upper casing 62U by a bolt. Note that, in this case, the bolt for connecting the load coupling cover 38 and the second upper casing 62U to each other is exposed outside of the combustor chamber 36.

Accordingly, a worker can detach the second upper casing 62U from the load coupling cover 38 by removing the bolt from outside of the combustor chamber 36 without a need for the worker to enter into the combustor chamber 36 and access a connecting portion between the second upper casing 62U and the load coupling cover 38.

The gas turbine 1 can include an opening having such a size that the worker can access the combustor chamber 36 at least in a part of the second upper casing 62U and the second lower casing 62D shown in FIG. 2. The opening is provided with a lid member for covering the opening. The lid member is fixed to the casing 60 by a bolt as a connecting member only from outside of the combustor chamber 36.

Also in this case, the load coupling cover 38 can be fixed to the second upper casing 62U by a bolt. The worker first removes the bolt for fixing the lid member to the casing 60 from outside of the combustor chamber 36. The worker then enters into the combustor chamber 36 to remove the bolt at the connecting portion between the second upper casing 62U and the load coupling cover 38. Accordingly, the second upper casing 62U is detached from the load coupling cover 38 of the gas turbine 1.

(Second Embodiment)

Figure 7:
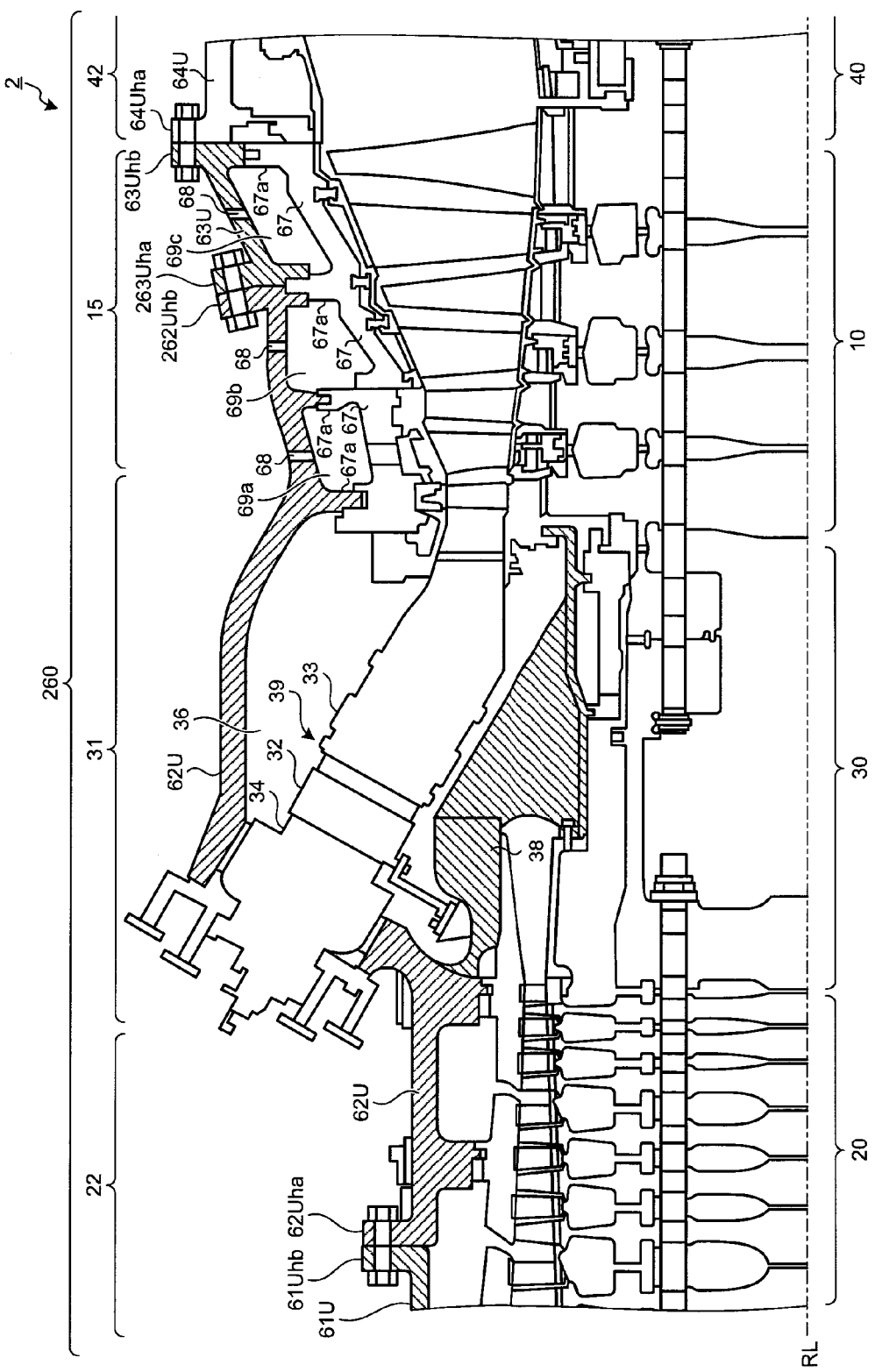
FIG. 7 is a schematic sectional view of a configuration of a casing of a gas turbine according to a second embodiment.

FIG. 7 is a schematic sectional view of a configuration of a casing of a gas turbine according to a second embodiment. A gas turbine 2 according to the second embodiment includes a casing 260. In the casing 260, a position of a connecting portion between the second upper casing 62U and the second lower casing 62D, and the third upper casing 63U is different from that of the gas turbine 1. As shown in FIG. 7, a second upper-side second longitudinal-flange 262Uhb and a third upper-side first longitudinal-flange 263Uha are formed in a portion opposite to the partition wall 67a between the second cooling-air chamber 69b and the third cooling-air chamber 69c.

The pressure of the fluid present in the second cooling-air chamber 69b is lower than that of the fluid present in the combustor chamber 36. Further, the pressure of the fluid present in the third cooling-air chamber 69c is lower than that of the fluid present in the combustor chamber 36. The pressure of the fluid present in the third cooling-air chamber 69c is also lower than that of the fluid present in the first cooling-air chamber 69a.

Accordingly, a force acting on the second upper-side second longitudinal-flange 262Uhb and the third upper-side first longitudinal-flange 263Uha of the gas turbine 2 shown in FIG. 7 is further smaller than that acting on the second upper-side second longitudinal-flange 62Uhb and the third upper-side first longitudinal-flange 63Uha of the gas turbine 1 shown in FIG. 3. Therefore, the second upper-side second longitudinal-flange 262Uhb and the third upper-side first longitudinal-flange 263Uha of the gas turbine 2 can be downsized.

Thus, in the gas turbine 2, as the second upper-side second longitudinal-flange 262Uhb and the third upper-side first longitudinal-flange 263Uha are provided toward the downstream side of the fluid flow in the turbine unit 10, the pressure of the fluid drops and the size of the second upper-side second longitudinal-flange 262Uhb and the third upper-side first longitudinal-flange 263Uha is decreased preferably. At the time of transporting the gas turbine 2; however, the size of the casing 260 is limited to a size that can be transported. Furthermore, there is a limit in the size of a member that can be manufactured in a machine tool used for manufacturing the gas turbine 2.

In the gas turbine 2, as the second upper-side second longitudinal-flange 262Uhb and the third upper-side first longitudinal-flange 263Uha are provided toward the downstream side of the fluid flow in the turbine unit 10, the size of the second upper casing 62U and the second lower casing 62D in the direction of the rotation axis RL increases. Therefore, in the gas turbine 2, it is desired that the second upper-side second longitudinal-flange 262Uhb and the third upper-side first longitudinal-flange 263Uha are provided on the downstream side of the fluid flow in the turbine unit 10 within a range in which the second upper casing 62U and the second lower casing 62D fit into the limit.

With this arrangement, in the gas turbine 2, the size of the second upper-side second longitudinal-flange 262Uhb and the third upper-side first longitudinal-flange 263Uha is decreased. Therefore, the gas turbine 2 can more preferably suppress a possibility that the casing exceeds the limit.

(Third Embodiment)

Figure 8:
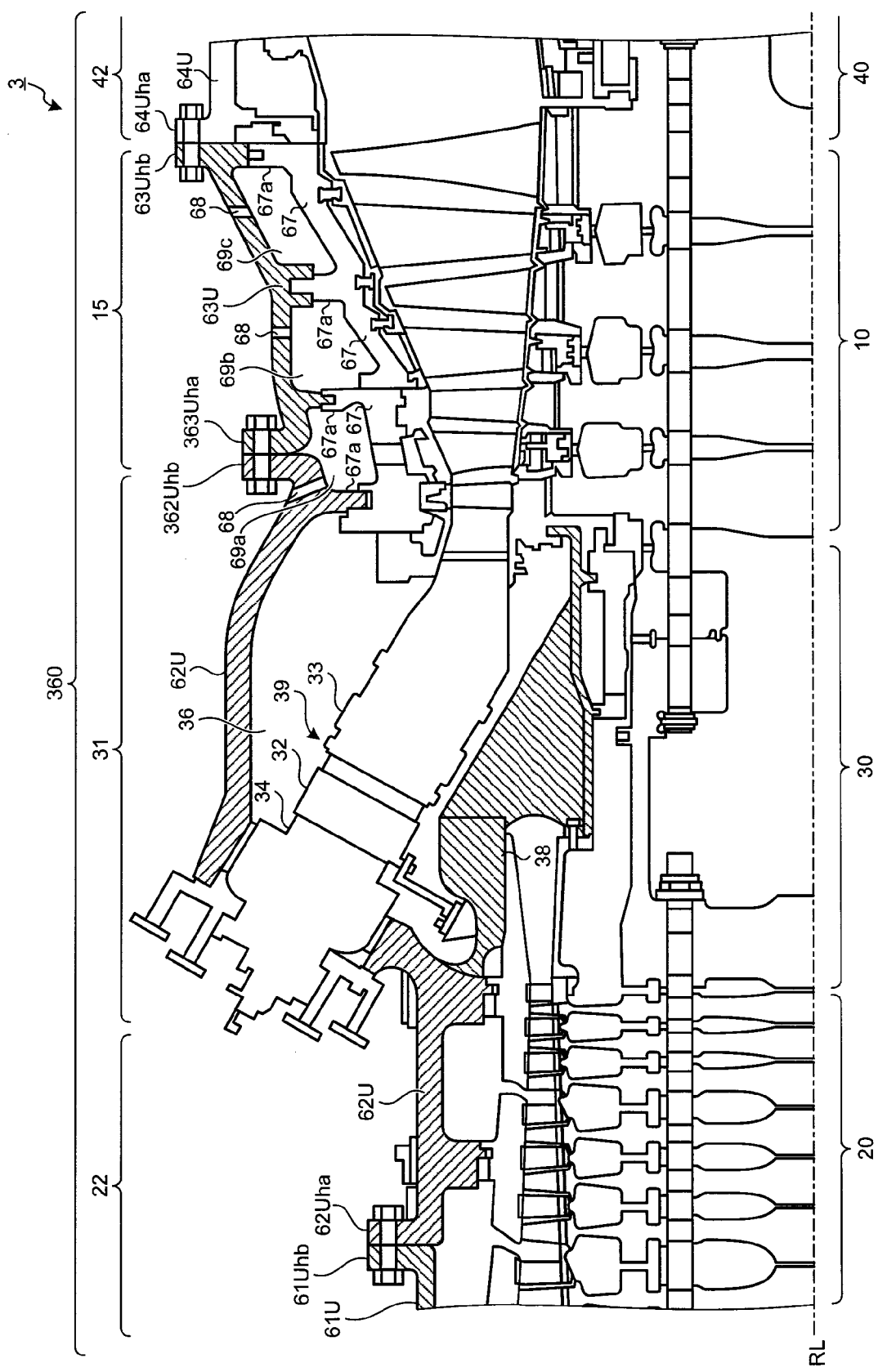
FIG. 8 is a schematic sectional view of a configuration of a casing of a gas turbine according to a third embodiment.

FIG. 8 is a schematic sectional view of a configuration of a casing of a gas turbine according to a third embodiment. A gas turbine 3 according to the third embodiment includes a casing 360. In the casing 360, respective connecting portions between the second upper casing 62U and the third upper casing 63U and between the second lower casing 62D and the third lower casing 63D are not formed at a portion opposite to the partition wall 67a between the first cooling-air chamber 69a and the second cooling-air chamber 69b.

A second upper-side second longitudinal-flange 362Uhb and a third upper-side first longitudinal-flange 363Uhb can be formed in the turbine unit casing 15 between the adjacent partition walls 67a, as shown in FIG. 8, so long as these do not interfere with the cooling-air introducing hole 68. Even in this case, in the gas turbine 3 according to the third embodiment, the second upper-side second longitudinal-flange 362Uhb and the third upper-side first longitudinal flange 363Uha can be downsized. Therefore, the gas turbine 3 can suppress a possibility that the casing exceeds the limit.

INDUSTRIAL APPLICABILITY

As described above, the gas turbines according to the above embodiments are useful for a divided casing of a gas turbine, and is particularly suitable for a gas turbine in which a force acting on a divided portion of a casing is reduced.

The invention claimed is:

1. A gas turbine comprising:
    a combustor chamber that houses a combustor unit configured to include a combustor that burns fuel to generate combustion gas for rotating a rotator;
    a turbine unit chamber that houses a turbine-side rotator, which is the rotator and rotates upon reception of the combustion gas;
    a compressor casing;
    a combustor casing that forms the combustor chamber inside thereof;
    a turbine unit casing that forms the turbine unit chamber inside thereof;
    a casing assembly that is configured to include the compressor casing, the combustor casing, and the turbine unit casing, in which
        a first divided portion on a surface orthogonal to a rotation axis of the rotator is not formed in the combustor casing, but is formed downstream of the combustor casing in the flow of the combustion gas, and
        a second divided portion on a surface orthogonal to the rotation axis of the rotator is not formed in the combustor casing, but is formed in the compressor casing upstream of the combustor casing in the flow of the combustion gas;
    a turbine-unit rotor blade constituting the turbine;
    a cooling air chamber which is formed inside the turbine unit casing and outside of the turbine-unit rotor blade in a radial direction of the rotation axis, and is supplied with cooling air for cooling the turbine;
    a partition member that protrudes toward an inner periphery of the casing assembly along a surface orthogonal to the rotation axis and divides the cooling air chamber; and
    a turbine diaphragm which is disposed inside the turbine unit casing and is formed by protruding the partition member toward outside in the radial direction,
    wherein
    the compressor casing, the combustor casing and the turbine unit casing are configured to be divisible into a lower casing on a ground and a unitary first upper casing which is farther than the lower casing from the ground, when the gas turbine is installed, respectively, wherein flanges provided on each the lower casing and the upper casing are connected by a bolt, the first divided portion is a connected surface where an upstream side flange disposed at upstream side of the combustion gas flow in the casing assembly and a downstream side flange disposed at downstream side of the combustion gas flow in the casing assembly are tightly connected such that the upstream side flange and the downstream side flange contact with one another, the connected surface of the upstream side flange is disposed at a position corresponding to a downstream side circumferential surface of the turbine diaphragm where the partition member disposed inside the turbine unit casing protrudes outward in the radial direction, and the unitary first upper casing extends from the second divided portion to the first divided portion.

2. The gas turbine according to claim 1, wherein the first divided portion is formed in a portion of the turbine unit chamber.

3. The gas turbine according to claim 1, wherein the cooling air chamber is configured to include a first cooling-air chamber arranged closest to the combustor chamber and a second cooling-air chamber adjacent to the first cooling-air chamber, and the first divided portion is formed in the casing assembly at a portion opposite to the partition member that divides the cooling air chamber into the first cooling-air chamber and the second cooling-air chamber.

4. The gas turbine according to claim 1, wherein at least one member among members constituting the combustor casing is fixed to the combustor unit by a connecting member that is provided only at outside of the combustor chamber.

5. The gas turbine according to claim 1, comprising a load coupling cover having a portion fitted into the casing assembly and supported inside of the combustor chamber, and supporting the combustor in the combustor unit.

6. A method of opening a chamber of a gas turbine according to claim 1, wherein
at least a part of members constituting a combustor casing is detached from outside of a combustor chamber, at a time of opening the chamber of the gas turbine.

7. The gas turbine according to claim 1, wherein, after the upper casing is removed upward vertically, the casing assembly is configured such that the downstream side circumferential surface of the turbine diaphragm is arranged in a straight line in the radial direction with the connected surface of the upstream side flange.

8. The gas turbine according to claim 1, further comprising a second upper casing downstream of the first upper casing, relative to the direction of flow through the gas turbine, wherein the gas turbine is configured such that the first upper casing and the turbine diaphragm have a downstream boundary bounded by a plane normal to the rotation axis and the second upper casing has an upstream boundary also bounded by the plane.

9. The gas turbine according to claim 8, wherein the gas turbine is configured such that after the first upper casing is removed, the turbine diaphragm can be lifted directly vertically upward to facilitate removal of the turbine diaphragm.

10. The gas turbine according to claim 1, wherein the turbine diaphragm is a first turbine diaphragm, the gas turbine further comprising a second upper casing and a second turbine diaphragm both located downstream the first upper casing, relative to the direction of flow through the gas turbine, wherein the gas turbine is configured such that the first upper casing and the turbine diaphragm have a downstream boundary bounded by a plane normal to the rotation axis and the second upper casing and the second turbine diaphragm have an upstream boundary also bounded by the plane.

11. The gas turbine according to claim 10, wherein the gas turbine is configured such that after the first upper casing is removed, the first turbine diaphragm can be lifted directly vertically upward to facilitate removal of the first turbine diaphragm.

12. The gas turbine according to claim 1, further comprising a second upper casing downstream from and immediately adjacent the first upper casing, when the turbine diaphragm is located under the first upper casing during operation of the gas turbine, and wherein the gas turbine is configured such that the first upper casing and the turbine diaphragm are removable from the gas turbine during maintenance and such that the turbine diaphragm can be lifted vertically upward after the first upper casing has been removed such that the turbine diaphragm and the second upper casing do not interfere with each other.

* * * * *